United States Patent
Jha et al.

(10) Patent No.: US 9,801,225 B2
(45) Date of Patent: *Oct. 24, 2017

(54) SYSTEM AND METHOD FOR CONTROLLING A LICENSED SHARED ACCESS RADIO

(71) Applicant: Intel Corporation, Santa Clara, CA (US)

(72) Inventors: Satish C. Jha, Hillsboro, OR (US); Mohammad Mamunur Rashid, Hillsboro, OR (US); Rath Vannithamby, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/342,584

(22) Filed: Nov. 3, 2016

(65) Prior Publication Data

US 2017/0055309 A1 Feb. 23, 2017

Related U.S. Application Data

(63) Continuation of application No. 14/538,575, filed on Nov. 11, 2014, now Pat. No. 9,532,376.

(51) Int. Cl.
*H04W 4/02* (2009.01)
*H04W 76/02* (2009.01)
(Continued)

(52) U.S. Cl.
CPC ......... *H04W 76/025* (2013.01); *H04W 16/14* (2013.01); *H04W 48/16* (2013.01);
(Continued)

(58) Field of Classification Search
CPC ..... H04W 48/20; H04W 48/04; H04W 68/00; H04W 72/0453; H04W 36/06; H04W 72/0406

USPC .......................................................... 455/434
See application file for complete search history.

(56) References Cited

U.S. PATENT DOCUMENTS

| 2001/0046861 A1 | 11/2001 | Attimont et al. |
| 2012/0058772 A1 | 3/2012 | Kazmi et al. |

(Continued)

FOREIGN PATENT DOCUMENTS

| WO | 2014067550 A1 | 5/2014 |
| WO | 2014078676 A2 | 5/2014 |

OTHER PUBLICATIONS

International Search Report and Written Opinion for International Application No. PCT/US2015/054776 mailed on Jan. 29, 2016; 11 pages.

*Primary Examiner* — Don N Vo
(74) *Attorney, Agent, or Firm* — Schwabe, Williamson & Wyatt, P.C.

(57) ABSTRACT

Embodiments described herein relate generally to a communication between a user equipment ("UE") and a plurality of evolved Node Bs ("eNBs"). A UE may be adapted to operate in a dual connectivity mode on respective wireless cells provided by first and second eNBs. The UE may communicate with a first eNB in a first frequency band. The UE may communicate with a second eNB in a second frequency band. The first eNB may detect that the second frequency band is unavailable. Based on this detection, the first eNB may notify the UE that communication in the second frequency band is no longer available. In response, the UE may control a radio to cease communication in the second frequency band. Other embodiments may be described and/or claimed.

20 Claims, 11 Drawing Sheets

(51) Int. Cl.
*H04W 74/00* (2009.01)
*H04W 72/04* (2009.01)
*H04W 16/14* (2009.01)
*H04W 48/16* (2009.01)
H04W 76/04 (2009.01)
H04W 84/04 (2009.01)

(52) U.S. Cl.
CPC ..... *H04W 72/0453* (2013.01); *H04W 74/002* (2013.01); *H04W 76/041* (2013.01); *H04W 84/042* (2013.01)

(56) References Cited

U.S. PATENT DOCUMENTS

| | | |
|---|---|---|
| 2013/0077554 A1 | 3/2013 | Gauvreau et al. |
| 2013/0244656 A1 | 9/2013 | Heo et al. |
| 2014/0073323 A1 | 3/2014 | Lee et al. |
| 2014/0162667 A1 | 6/2014 | Mueck |
| 2014/0198734 A1 | 7/2014 | Yamada et al. |
| 2014/0241281 A1 | 8/2014 | Wu |
| 2014/0301360 A1 | 10/2014 | Bontu et al. |
| 2014/0335882 A1 | 11/2014 | Lee et al. |
| 2015/0085833 A1 | 3/2015 | Han et al. |
| 2015/0092707 A1* | 4/2015 | Kwon ................ H04W 76/025 370/329 |
| 2016/0149678 A1* | 5/2016 | Akimoto ............... H04L 5/0035 370/330 |
| 2016/0212662 A1* | 7/2016 | Lee ...................... H04W 36/04 |
| 2016/0255583 A1* | 9/2016 | Takeda ................ H04W 76/048 |

\* cited by examiner

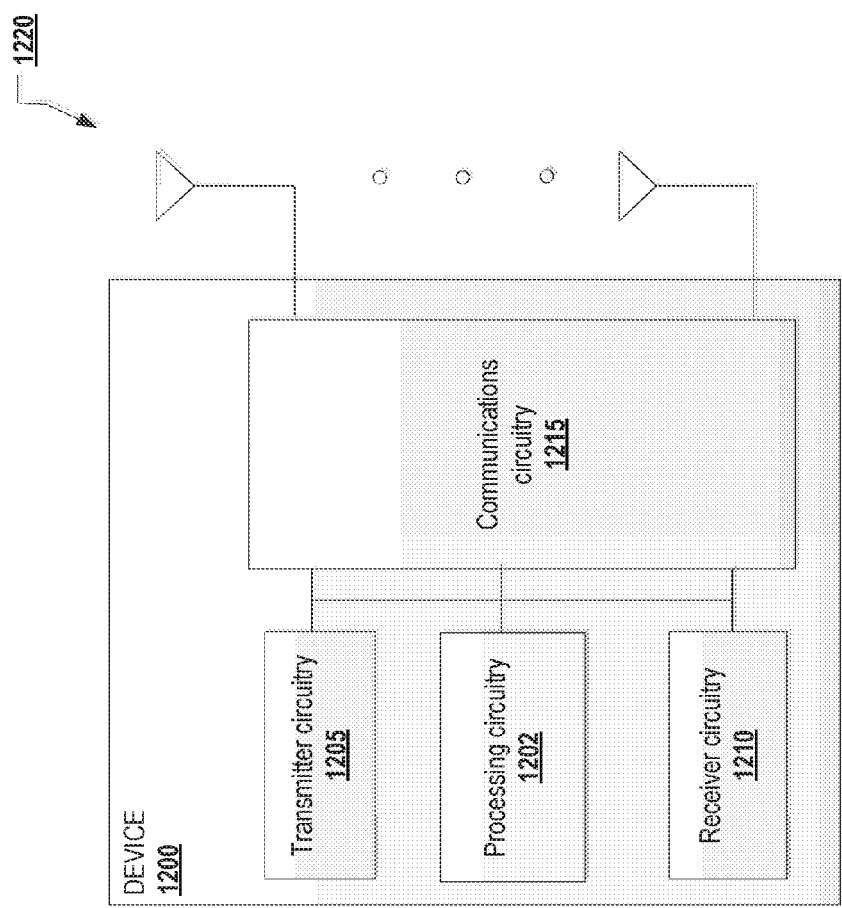

SYSTEM AND METHOD FOR CONTROLLING A LICENSED SHARED ACCESS RADIO

CROSS REFERENCE TO RELATED APPLICATION

This application is a continuation of U.S. application Ser. No. 14/538,575, filed Nov. 11, 2014, whereas the contents and disclosure of which are hereby incorporated by reference in its entirety.

FIELD

Embodiments of the present invention relate generally to the technical field of data processing, and more particularly, to computer devices operable to communicate data over a network.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by their inclusion in this section.

In communicating in a radio access network, a mobile terminal and a base station may communicate in a frequency band. Radio frequency bands may be regulated, for example, by the government. A frequency band may be licensed so that communication may occur in that band. Pursuant to the licensing of a frequency band, a mobile terminal and a base station may be configured to communicate in that frequency band.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they may mean at least one.

FIG. 12 is a block diagram illustrating a transmitting device, in accordance with various embodiments.

DETAILED DESCRIPTION

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A or B" and "A and/or B" means (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the terms "module" and/or "logic" may refer to, be part of, or include an Application Specific Integrated Circuit ("ASIC"), an electronic circuit, a processor (shared, dedicated, or group), and/or memory (shared, dedicated, or group) that execute one or more software or firmware programs, a combinational logic circuit, and/or other suitable hardware components that provide the described functionality.

Figure 1:
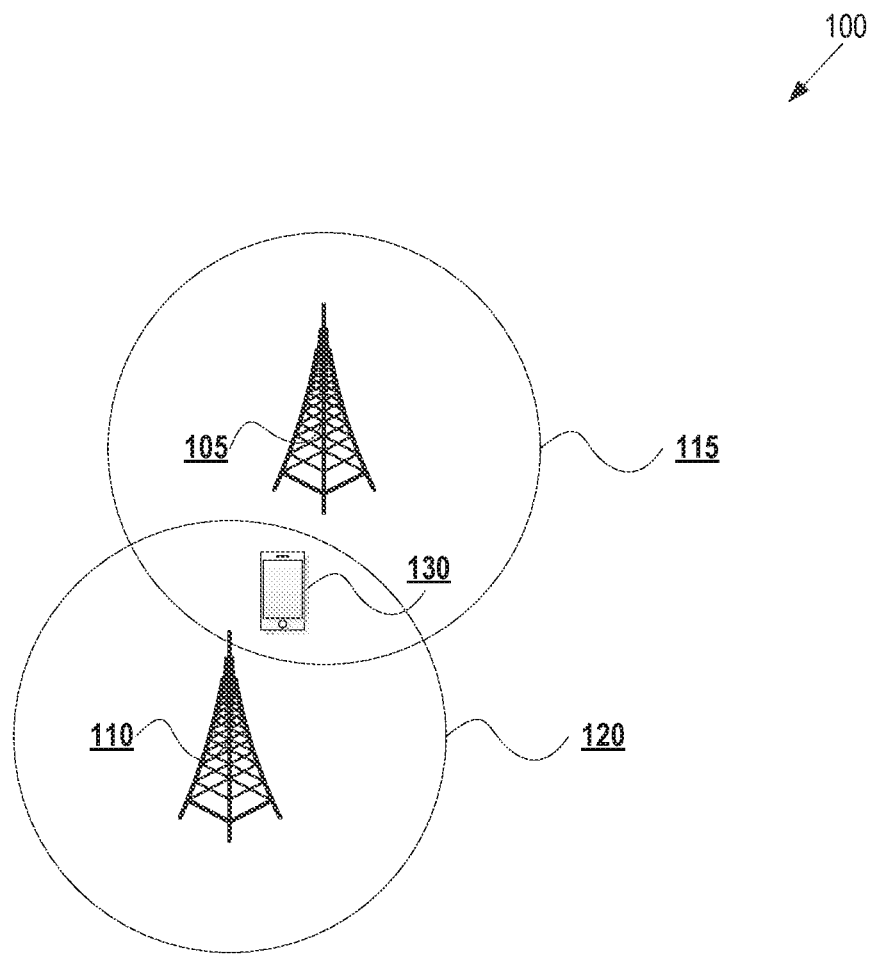
FIG. 1 is a block diagram illustrating an environment in which a user equipment may be adapted for dual connectivity using two frequency bands, in accordance with various embodiments.

Beginning first with FIG. 1, a block diagram shows an environment 100 in which a user equipment ("UE") 130 may be adapted for dual connectivity using two frequency bands, in accordance with various embodiments. The UE 130 may be any type of computing device equipped with broadband circuitry and adapted to operate on a cell (e.g., the cell 115) according to, for example, one or more $3^{rd}$ Generation Partnership Project ("3GPP") technical specifications. For example, the UE 130 may be a netbook, a tablet computer, a handheld computing device, a web-enabled appliance, a gaming device, a mobile phone, a smartphone, an eBook reader, a personal data assistant, or the like. In another embodiment, the UE 130 may be a computing device that is not primarily adapted for user communications (e.g., voice calling, text/instant messaging, web browsing), such as a smart metering device, payment device (e.g., a "pay-as-you-drive" device), a vending machine, a telematics system (e.g., a system adapted for tracking and tracing of vehicles), a security system (e.g., a surveillance device), and the like.

According to embodiments, the UE 130 may be configured for intersystem communication by operating on one or more wireless cells 115, 120. The one or more wireless cells 115, 120 may overlap in coverage. Because the UE 130 may be adapted for dual connectivity, the UE 130 may simultaneously operate on two wireless cells 115, 120 such that two evolved Node Bs ("eNBs") 105, 110 simultaneously provide the UE 130 with radio resources. In some embodiments, both cells 115, 120 may be primary cells ("PCells"). The UE 130 may simultaneously operate in a Radio Resource Control ("RRC") connected ("RRC_Connected") state on both cells 115, 120.

The first wireless cell 115 may be provided by a first eNB 105. In dual connectivity, the first eNB 105 may be a master eNB and, therefore, may terminate the S1-Mobility Management Entity ("MME") interface. Further, the master eNB 105 may act as a mobility anchor towards a core network (not shown). The master eNB 105 may be part of a master cell group ("MCG") that includes other serving cells (not shown) associated with the master eNB 105.

The second wireless cell 120 may be provided by a second eNB 110. In dual connectivity, the second eNB 110 may be a secondary eNB, which may be an eNB that is to provide radio resources to the UE 130 but is not the master eNB. The secondary eNB 110 may be part of a secondary cell group ("SCG"). In embodiments, the cell 120 of the SCG may be referred to by the abbreviation "PSCell." The master eNB 105 and the secondary eNB 110 may be connected through non-ideal backhaul (e.g., via the X2 interface).

At least one of the eNBs 105, 110 may connect the UE 130 to a core network as part of, for example, a third Generation ("3G"), fourth Generation ("4G"), fifth Generation ("5G"), or beyond system that adheres to one or more standards, such as Long Term Evolution ("LTE"), LTE-Advanced ("LTE-A"), or other similar standard.

For dual connectivity, the environment 100 may feature bearer splitting so that the UE 130 may receive bearers from both the master eNB 105 and the secondary eNB 110. In one embodiment of a user plane architecture in the downlink, respective bearers may belong to each eNB 105, 110. In another embodiment of a user plane architecture in the downlink, a bearer may be split at the master eNB 105 to the secondary eNB 110. For a user plane architecture in the uplink by the UE 130, bearer splitting may or may not be implemented. In embodiments, the master eNB 105 may handle radio resource management ("RRM"), as well as the addition, release, and modification of the secondary eNB 110 and/or other secondary cells.

In various embodiments, the first cell 115 and the second cell 120 may be deployed on different frequencies. The first cell 115 may operate in a first frequency band f1. The first frequency band f1 may be a spectrum band that is compatible with LTE, LTE-A, or another similar standard.

The second cell 120 may operate on another frequency band f2 that is outside the spectrum band of f1. For example, f2 may not be a spectrum band that is compatible with LTE, LTE-A, or another similar standard. In some embodiments, f2 may be higher than f1 (e.g., between 2300 and 2400 MHz)—for example, where the second cell 120 has a smaller coverage area than the first cell 115, a higher frequency band may be more suitable. In some embodiments, f2 may not overlap with f1.

According to embodiments, f2 may be associated with Licensed Shared Access ("LSA"). According to LSA, an incumbent holder may allow coordinated shared access by a secondary group of users (e.g., operators) to a spectrum band licensed to that incumbent holder—e.g., a government entity, such as the military, having a spectrum band licensed thereto may allow coordinated access by non-government operators to that licensed spectrum band. However, the incumbent holder of such an LSA band may retain exclusive right to that LSA band and may reclaim the LSA band from secondary users as necessary.

The incumbent holder may dynamically request the release of f2 so that the second cell 120 may no longer communicate in that frequency band. Thus, the LSA band f2 may become unavailable even though one or more bearers are operating in that band f2. In various embodiments, the LSA band f2 may be released within a "grace period" so that communication may be adjusted without abrupt termination.

When f2 is reclaimed by the incumbent holder, a bearer for UE 130 that is through secondary eNB 110 may be reconfigured on another frequency band. For example, a bearer for UE 130 through secondary eNB 110 in f2 may be reconfigured to master eNB 105 in f1 when f2 is reclaimed by the incumbent holder.

In various embodiments, the master eNB 105 may detect that the LSA band f2 is unavailable. For example, the master eNB 105 may receive a notification from a core network and/or from an LSA server that is to indicate that the LSA band f2 is unavailable. Based on a detection that the LSA band f2 is unavailable, the master eNB 105 stop bearer splitting to prevent a bearer from traveling through the secondary eNB 110 (if the master eNB 105 performs the bearer splitting).

If f2 is unavailable, the secondary eNB 110 may be unable to communicate with the UE 103. Therefore, the secondary eNB 110 may transmit data associated with the UE 130 (e.g., uplink and/or downlink traffic for the core network) to the master eNB 105 so that such data may be shifted to a bearer through the master eNB 105. In embodiments, the secondary eNB 110 may send data associated with the UE 130 through an interface, such as an X2-interface (e.g., an interface defined between the eNBs for dual connectivity).

According to embodiments, the master eNB 105 may notify the UE 130 that the band f2 is unavailable. In response, the UE 130 may stop transmission on a bearer through the secondary eNB 110 in the band f2. In some embodiments, the UE 130 may transition a radio associated with LSA connectivity into a low power mode—e.g., the UE 130 may deactivate or turn off an LSA radio when the UE 130 is no longer communicating in f2.

In one embodiment, the master eNB 105 may notify the UE 130 using a paging message. The paging message may include a dedicated field for notifying the UE 130 that an LSA band is or is not available. The master eNB 105 may broadcast a paging message, which may be helpful when the UE 130 is in a radio resource control ("RRC") idle state.

In another embodiment, the master eNB 105 may notify the UE 130 that f2 is unavailable using a media access control ("MAC") control element. In various embodiments, this may be a new MAC control element dedicated to indicating whether an LSA band is or is not available. Such a MAC control element may include a data field that is zero or more bytes.

In a third embodiment, the master eNB 105 may notify the UE 130 that f2 is unavailable using RRC signaling. In such an embodiment, the master eNB 105 may transmit a dedicated message to the UE 130 that may be faster than a broadcast message based on a broadcast message frequency.

In addition to f2, one or more other LSA bands may be available. For example, where f2 is unavailable, a third band f3 that is also associated with LSA may be available. Therefore, the master eNB 105 may notify the UE 130 of f3 so that the UE 130 may continue dual connectivity in f3.

In embodiments in which f2 becomes unavailable but f3 is available, bearer splitting between the master eNB 105 and the secondary eNB 110 may continue. However, the secondary eNB 110 may be reconfigured to communicate in f3 rather than f2. For example, the secondary eNB 110 may receive an indication of f3 from a core network, an LSA server, and/or from the master eNB 105.

Figure 2:
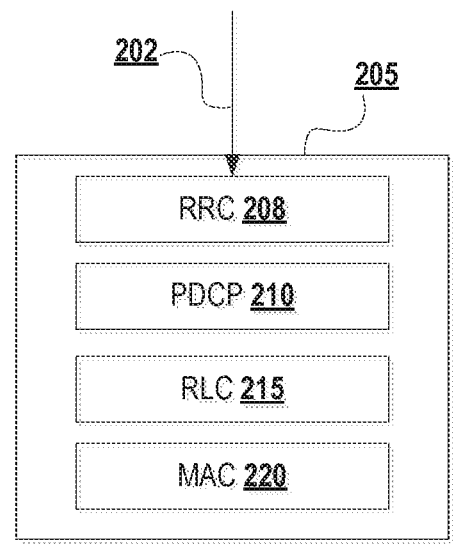
FIG. 2 is a block diagram illustrating the architectures of two evolved Node Bs to serve a dually connected UE using two frequency bands, in accordance with various embodiments.
Figure 2:
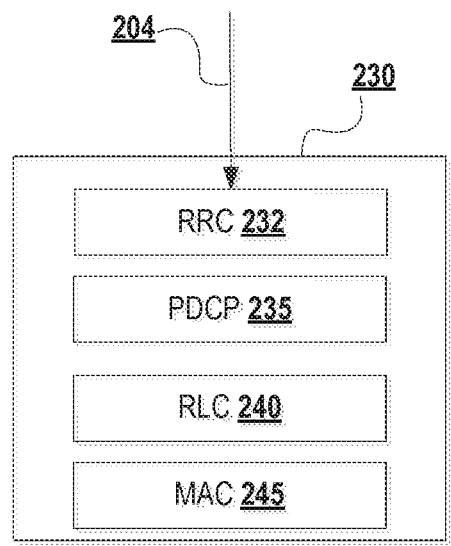

With respect to FIG. 2, a block diagram illustrates the architectures of two eNBs 205, 230, in accordance with various embodiments. The eNBs 205, 230 may be embodiments of the eNBs 105, 110 illustrated in FIG. 1. In various embodiments, each eNB 205, 230 may be adapted to provide a wireless cell on which a UE may operate. According to various embodiments, the master eNB 205 may communicate with the UE in a first frequency band f1. This f1 band may be associated with an LTE standard. The secondary eNB 230 may communicate with the UE in a second frequency band f2. This f2 band may be associated with LSA and, therefore, may be controlled by an incumbent holder.

According to embodiments, a first eNB 205 may be a master eNB. In dual connectivity environments, the master eNB 205 may be an eNB that terminates the S1 Mobility Management Entity ("MME"). Therefore, the master eNB 205 may act as a mobility anchor toward a core network. In various embodiments, the master eNB 205 may be adapted to provide radio resources to a UE while the UE operates in an RRC_Connected state associated with the wireless cell provided by the master eNB 205.

According to embodiments, a second eNB 230 may be a secondary eNB. In dual connectivity environments, the secondary eNB 230 may be an eNB that provides additional radio resources to a dually connected UE, but is not the master eNB 205. The master eNB 205 and the secondary eNB 230 may be connected with non-ideal backhaul, for example, using the X2 interface. In various embodiments, the secondary eNB 230 may be adapted to provide radio resources to a UE while the UE operates in an RRC_Connected state associated with the wireless cell provided by the secondary eNB 230.

In the embodiment illustrated in FIG. 2, bearers 202, 204 (e.g., data streams through an Evolved Packet Switched System ("EPS") to an eNB and UE) may not be split, but may be independently received at the master eNB 205 and the secondary eNB 230. In such embodiments, a first bearer 202 may be received at the master UE 205 and a second bearer 204 may be independently received at the secondary UE 230. The bearers 202, 204 may be received at the respective eNBs 205, 230 through the S1 interface, and the S1-U may terminate at the secondary eNB 230.

Due to the independent reception of the bearers 202, 204, the master eNB 205 and the secondary eNB 230 may include separate RRC layer entities 208, 232. Each of the RRC layer entities 208, 232 may perform operations for the respective eNBs 205, 230 associated with access stratum and transport of the non-access stratum ("NAS") messages, paging, establishment and release of RRC connections, security key management, handover, mobility, quality of service ("QoS"), and the like. At respective eNBs 205, 230, respective RRC layer entities 208, 232 may be communicatively coupled with respective Packet Data Convergence Protocol ("PDCP") layer entities 210, 235. At each eNB 205, 230, the PDCP layer entities 210, 235 may be associated with, for example, interface control over the radio network and user planes toward the Evolved Packet Core ("EPC"). Further, the PDCP layer entities 210, 235 may perform compression and decompression of Internet protocol ("IP") headers. The PDCP layer entities 210, 235 may be communicatively coupled with respective Radio Link Control ("RLC") layer entities 215, 240. The RLC layer entities 215, 240 may provide, for example, concatenation, segmentation, and/or reassembly of data units (e.g., protocol data units and/or service data units), sequential delivery of data units, duplication detection, error recovery, and the like for communication between the EPC and the UE. Additionally, respective RLC layer entities 215, 240 may be communicatively coupled with respective Media Access Control ("MAC") layer entities 220, 245. The MAC layer entities 220, 245 may provide addressing and channel access mechanisms, as well as interfacing with respective physical ("PHY") layer entities of the eNBs 205, 230 so that the bearers 202, 204 may reach the dually connected UE.

In various embodiments, the master eNB 205 may be adapted to communicate a bearer with a UE in the f1 band. The secondary eNB 230 may be adapted to communicate the split bearer with the UE in the f2 band.

In instances in which the f2 band becomes unavailable (e.g., the incumbent holder of f2 reclaims f2), the second bearer 204 may be reconfigured on another band, such as an LTE-compatible band. For example, the core network and/or an LSA server may notify the master eNB 205 that f2 is unavailable and the master eNB 205 may be adapted to send through the first bearer 202 traffic that may have been routed through the second bearer 204 if f2 were available. In some embodiments, the secondary eNB 204 may be adapted to send data that may have been routed through the second bearer 204 if f2 were available to the master eNB 205 so that the master eNB 205 may send such data to the UE, for example, using the first bearer 202 in f1.

Figure 3:
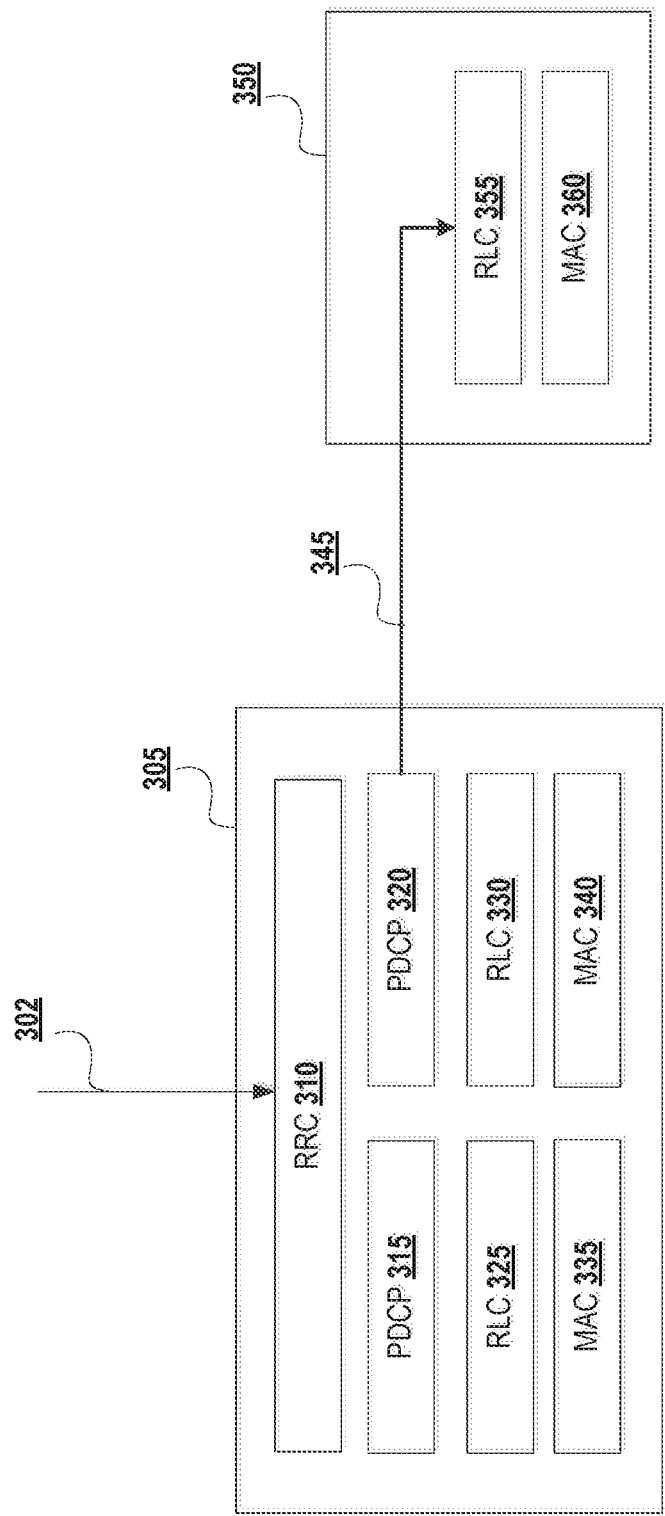
FIG. 3 is a block diagram illustrating other architectures of two evolved Node Bs to serve a dually connected UE using two frequency bands, in accordance with various embodiments.

Turning to FIG. 3, a block diagram illustrates the architectures of two eNBs 305, 340, in accordance with various embodiments. The eNBs 305, 340 may be embodiments of the eNBs 105, 110 illustrated in FIG. 1. In various embodiments, each eNB 305, 350 may be adapted to provide a wireless cell on which a dually connected UE may operate. According to various embodiments, the master eNB 305 may communicate with the UE in a first frequency band f1. This f1 band may be associated with an LTE standard. The secondary eNB 350 may communicate with the UE in a second frequency band f2. This f2 band may be associated with LSA and, therefore, may be controlled by an incumbent holder.

According to embodiments, the first eNB 305 may be the master eNB and may act as a mobility anchor toward a core network. The second eNB 350 may be a secondary eNB. The master eNB 305 and the secondary eNB 350 may be connected with non-ideal backhaul, for example, using an X2 interface connection 345.

In embodiments, bearers 302 may be received at the master eNB 305 and bearer split may be employed at master eNB 305. The master eNB 305 may process the bearer 302 according to the stack that includes an RRC layer entity 310, a first PDCP layer entity 315, a first RLC layer entity 325, and a first MAC layer entity 335. In such embodiments, the S1-U may terminate at the master eNB 305. The master eNB 305 may split the bearer 302 at a second PDCP layer entity 320.

Because the eNBs 305, 350 are connected through backhaul, the master eNB 305 may transmit at least a part of the split bearer to the secondary eNB 350 using the X2 interface connection 345. In some embodiments in which the bearer split occurs in the master eNB 305, data from the split bearer may be received by the secondary eNB 350 at an independent RLC layer entity 355, which may be communicatively coupled with the MAC layer entity 360 of the secondary eNB 340. Accordingly, the master eNB 305 may receive EPS bearers, but radio resources of the secondary eNB 350 may be used to provide the split bearer to a dually connected UE.

In various embodiments, the master eNB 305 may be adapted to communicate a bearer with a UE in the f1 band. The secondary eNB 350 may be adapted to communicate the split bearer with the UE in the f2 band.

In instances in which the f2 band becomes unavailable (e.g., the incumbent holder of f2 reclaims f2), a second bearer through secondary eNB 350 may be reconfigured on another band, such as an LTE-compatible band. For example, the core network, the master eNB 305, and/or an LSA server may cause data to be reconfigured through a first bearer through master eNB 305. The master eNB 305 may cease splitting the bearer 302 at the PDCP layer entity 320.

In some embodiments, the secondary eNB 305 may be adapted to send data that may have been routed through the second bearer if f2 were available to the master eNB 305 so that the master eNB 305 may send such data to the UE, for example, using the first bearer in f1.

In some embodiments, a hybrid approach to dual connectivity may be utilized. For example, a master eNB (e.g., the master eNB 305) may be adapted to split a bearer and, contemporaneously, another bearer travels through a secondary eNB (e.g., the secondary eNB 230 of FIG. 2)—e.g., this scenario may be a hybrid of FIGS. 2 and 3. In such embodiments and where f2 becomes unavailable, a bearer traveling through a secondary eNB (e.g., a non-split bearer 204 through secondary eNB 230) may be reconfigured and/or modified before a split bearer (e.g., bearer 302). A split bearer may continue to satisfactorily function over the air (e.g., through a connection with the master eNB 305), whereas a non-split bearer (e.g., bearer 204) may adversely affect data communication more rapidly.

Figure 4:
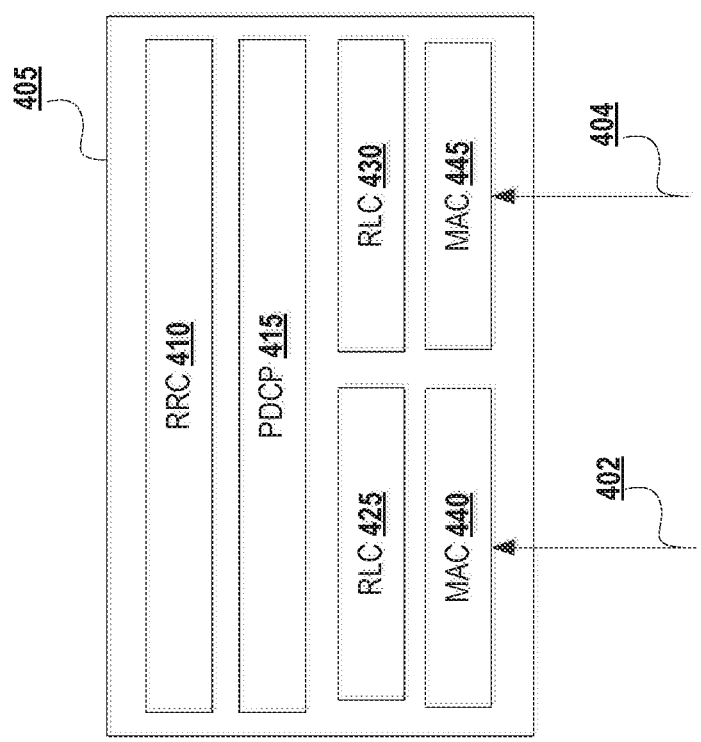
FIG. 4 is a block diagram illustrating the architecture of a user equipment that may operate in a dual connected mode using two frequency bands, in accordance with various embodiments.

With reference to FIG. 4, a block diagram illustrates the architecture of a UE 405, in accordance with various embodiments. The UE 405 may be an embodiment of the UE 130 illustrated in FIG. 1. In various embodiments, a UE 405 may be adapted to operate on at least one wireless cell provided by an eNB.

According to embodiments, the UE 405 may be adapted to operate in a dual connected mode or state. That is, the UE 405 may be adapted to simultaneously operate on wireless cells provided by a master eNB and a secondary eNB. In dual connectivity environments, the UE 405 may be simultaneously or contemporaneously provided radio resources by both the master eNB and the secondary eNB. Therefore, the UE 405 may simultaneously operate in an RRC_Connected state associated with wireless cells provided by the master eNB and the secondary eNB. According to various embodiments, the UE 405 may communicate with the master eNB in a first frequency band f1. This f1 band may be associated with an LTE standard. The UE 405 may communicate with the secondary eNB in a second frequency band f2. This f2 band may be associated with LSA and, therefore, may be controlled by an incumbent holder.

In the embodiment illustrated in FIG. 4, a bearer may be split at the master and secondary eNB and therefore bearers 402, 404 may be a split of a single bearer. In various embodiments, the bearers 402, 404 may be data radio bearers ("DRBs"). The first bearer 402 may be associated with the f1 band, whereas the second bearer 404 may be associated with the f2 band.

Due to the reception of the bearers 402, 404, the UE 405 may include two MAC layer entities 440, 445. The MAC layer entities 440, 445 may provide addressing and channel access mechanisms, as well as interfacing with one or more PHY layer entities (not shown) of the UE 405. The MAC layer entities 440, 445 may be coupled with respective RLC layer entities 425, 430. The RLC layer entities 425, 430 may provide, for example, concatenation, segmentation, and/or reassembly of data units (e.g., protocol data units and/or service data units), sequential delivery of data units, duplication detection, error recovery, and the like for communication between the UE and the EPC.

Coupled with the RLC layer entities 425, 430, the UE 405 may include a PDCP layer entity 415. The PDCP layer entity 415 may be associated with, for example, interface control over the radio network and may perform compression and decompression of IP headers. The bearers 402, 404 may be processed in the UE 405 through separate MAC layer entities 440, 445 and RLC layer entities 425, 430, but may be processed together at the PDCP layer 415. The PDCP layer 415 may be communicatively coupled with an RRC layer entity 410. The RRC layer entity 410 may perform operations associated with access stratum and transport of the non-access stratum ("NAS") messages, paging, establishment and release of RRC connections, security key management, handover, mobility, QoS, and the like.

The UE 405 may receive an indication that the band f2 in which the second bearer 404 is communicated is unavailable. In response, the UE 405 may reconfigure the traffic associated with the second bearer 404 onto the first bearer 402. However, the UE 405 may reconfigure the second bearer 404 on another LSA band f3 if an f3 band is available. If no other LSA band is available, and therefore the UE 405 may no longer communicate in an LSA band, the UE 405 may be adapted to transition a circuitry adapted for LSA communication to a low-power state (e.g., the UE 405 may switch off an LSA radio).

Figure 5:
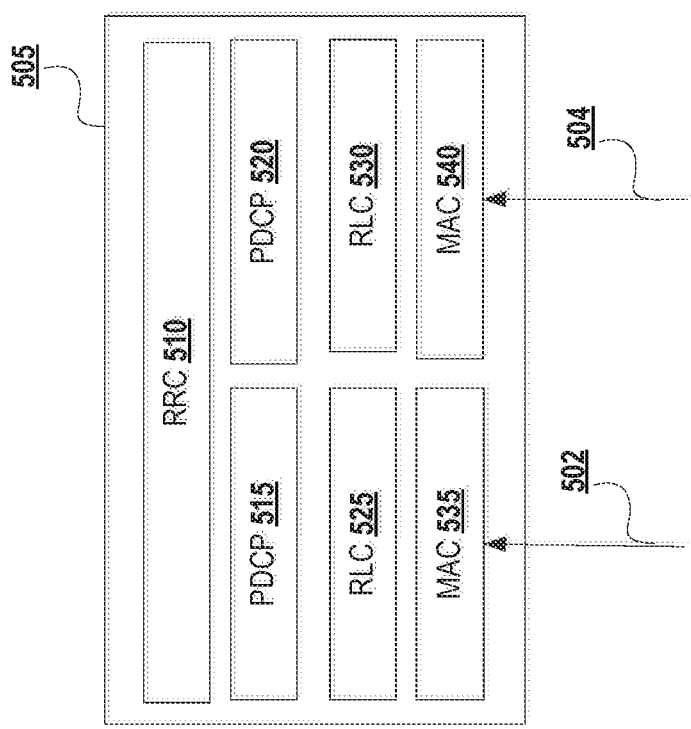
FIG. 5 is a block diagram illustrating another architecture of a user equipment that may operate in a dual connected mode using two frequency bands, in accordance with various embodiments.

At FIG. 5, a block diagram illustrates the architecture of a UE 505, in accordance with various embodiments. The UE 505 may be an embodiment of the UE 130 illustrated in FIG. 1. In various embodiments, a UE 505 may be adapted to operate on at least one wireless cell provided by an eNB.

According to embodiments, the UE 505 may be adapted to operate in a dual connected mode or state. That is, the UE 505 may be adapted to simultaneously operate on wireless PCells provided by a master eNB and a secondary eNB. In dual connectivity environments, the UE 505 may be simultaneously or contemporaneously provided radio resources by both the master eNB and the secondary eNB. Therefore, the UE 505 may simultaneously operate in an RRC_Connected state associated with wireless PCells provided by the master eNB and the secondary eNB. In the illustrated embodiment, two bearers may be independently received at the UE 505—a first bearer 502 from the master eNB and a second bearer 504 from the secondary eNB.

In embodiments, a bearer may be split at a PDCP layer and received at the UE 505 as bearers 502, 504 from a master eNB and secondary eNB 404, respectively. In various embodiments, the bearers 502, 504 may be DRBs.

Due to the independent reception of the first bearer 502 and the second bearer 504, the UE 505 may include two MAC layer entities 535, 540. The MAC layer entities 535, 540 may be coupled with respective RLC layer entities 525, 530. Further, the RLC layer entities 525, 530 may be coupled with respective PDCP layer entities 515, 520. The bearers 502, 504 may be processed together at RRC layer entity 510.

The UE 505 may receive an indication that the band f2 in which the second bearer 504 is communicated is unavailable. In response, the UE 505 may reconfigure the second bearer 504 on the first band f1 or, if another LSA band f3 is available, on the other LSA band f3. If no other LSA band is available, and therefore the UE 405 may no longer communicate in an LSA band, the UE 405 may be adapted to transition a circuitry adapted for LSA communication to a low-power state (e.g., the UE 405 may switch off an LSA radio).

Figure 6:
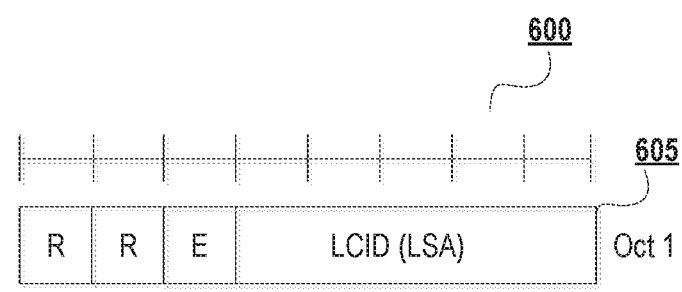
FIG. 6 is a block diagram illustrating a Media Access Control control element associated with a Licensed Shared Access frequency band, in accordance with various embodiments.

Now with reference to FIG. 6, a block diagram illustrates a MAC control element 600 associated with LSA, in accordance with various embodiments. The MAC control element 600 may be used for communication between a UE and a master eNB, such as the UE 130 and the master eNB 105 of FIG. 1. The "R" fields may indicate reserved fields (e.g., fields set to a "0" bit) and "E" fields may indicate an Extension field. The MAC control element 600 may include at least one octet.

At the first octet, the MAC control element 600 may include a link control identifier ("LCID") 605. The LCID 605 may be reserved for downlink transport channel ("DL-SCH") and may be associated with an index of 01011-11010. The LCID 605 may include an indication of an LSA band f2, such as one or more values that delineate f2. The LCID 605 may further include an indication of whether f2 is available or unavailable.

Figure 7:
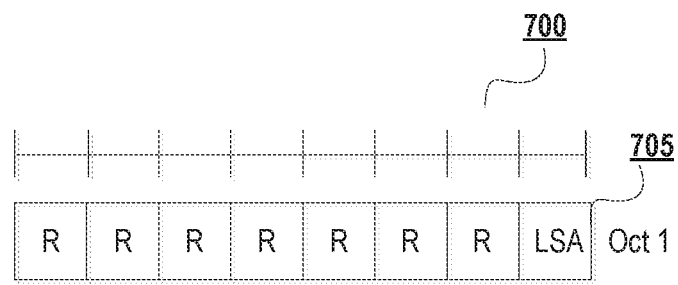
FIG. 7 is a block diagram illustrating another Media Access Control control element associated with a Licensed Shared Access frequency band, in accordance with various embodiments.

Similar to FIG. 6, FIG. 7 shows a block diagram of a MAC control element 700 associated with LSA, in accordance with various embodiments. The MAC control element 700 may be used for communication between a UE and a master eNB, such as the UE 130 and the master eNB 105 of FIG. 1. The "R" fields may indicate reserved fields (e.g., fields set to a "0" bit). The MAC control element 700 may include at least one octet.

In some embodiments, a master eNB may only notify a UE of whether communication in an LSA band f2 is to occur. For example, only one available additional band f2 may be associated with LSA and available for dual connectivity by a UE. One or more values of f2 (e.g., one or more values of a frequency range) may be predefined in the UE and, therefore, a master eNB may not notify the UE of the one or more values associated with f2. Therefore, in various embodiments, the MAC control element 700 may include a data field 705 that indicates whether communication in f2 is to occur. The data field 705 may be a flag (e.g., a Boolean value).

Figure 8:
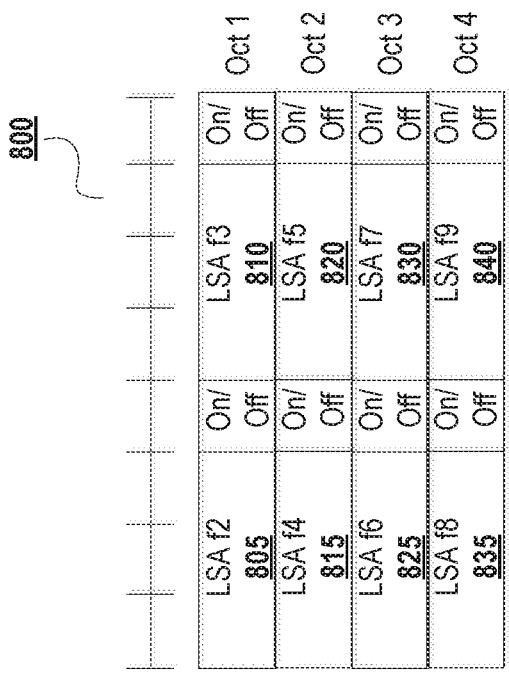
FIG. 8 is a block diagram illustrating a Media Access Control control element associated with a plurality of Licensed Shared Access frequency bands, in accordance with various embodiments.

FIG. 8 illustrates a third embodiment of a MAC control element 800 associated with LSA, in accordance with various embodiments. In some environments, a plurality of LSA bands f2-19 may be available for a dual connectivity by a UE. A master eNB may be adapted to indicate, using the MAC control element 800, one or more values associated with f2-19 as well as respective indications of whether f2-f9 are available.

At a first octet, the MAC control element 800 may include an indication 805 of an LSA band f2, such as one or more values that delineate f2. The LCID 805 may further include an indication of whether f2 is available or unavailable. This first octet may additionally include an indication 810 of another LSA band f3, as well as an indication of whether f3 is available. Similarly, the MAC control element 800 may include a plurality of additional octets that include a plurality of indications 815-840 of a plurality of LSA bands f4-f9, as well as respective indications of whether those LSA bands f4-f9 are available.

As an alternative, or in addition to, one or more MAC control elements 600-800 of FIGS. 6-8, a master eNB may indicate information associated with LSA to a UE using a paging message. The paging message may include one or more fields dedicated to LSA information (e.g., an "LSA-OnOff" field). In one embodiment, such an LSA field may be a Boolean value to indicate whether LSA is available. In another embodiment, one or more LSA fields may include a list of LSA bands, as well as indication of whether those LSA bands are available (e.g., inclusion in an LSA field may indicate that the LSA band is available or unavailable). Table 1 illustrates an embodiment of a paging messaging having a field associated with LSA:

TABLE 1 cmas-Indication:
If present: indication of a CMAS notification.
cn-Domain:
Indicates the origin of paging.
eab-ParamModification:
If present: indication of a EAB parameters (SIB14) modification.
etws-Indication:
If present: indication of an ETWS primary notification and/ or ETWS secondary notification.
IMSI:
The International Mobile Subscriber Identity, a globally unique permanent subscriber identity. The first element contains the first IMSI digit, the second element contains the second IMSI digit and so on.
systemInfoModification:
If present: indication of a BCCH modification other than SIB10, SIB11, SIB12 and SIB14.
ue-Identity:
Provides the NAS identity of the UE that is being paged.
LSAOnOff:
    If present: LSAOnOff =0 means LSA is not available (i.e. LSA OFF or LSA taken back by incumbent users),
LSAOnOff =1 means LSA is now available (i.e. LSA ON).
    In case of multiple LSA bands in the system, LSAOnOff paging field contains list of LSA bands which are currently unavailable.

Figure 9:
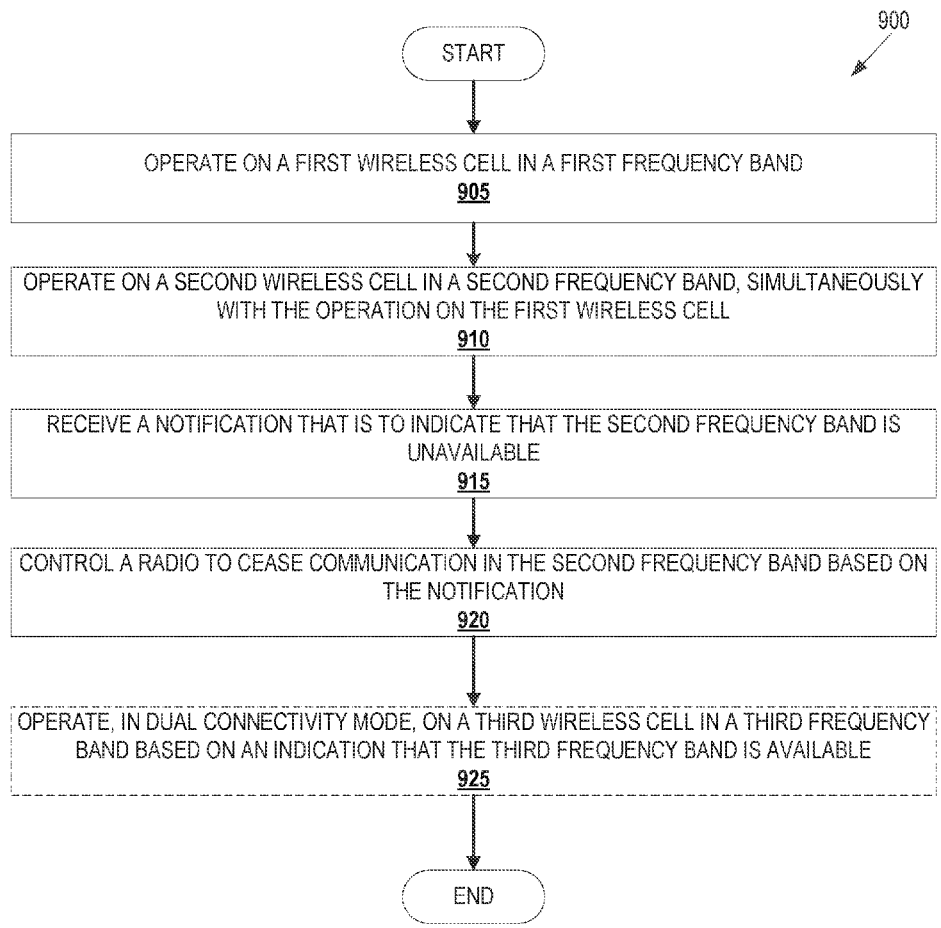
FIG. 9 is a flow diagram illustrating a method for operating in dual connectivity with a Licensed Shared Access frequency band, in accordance with various embodiments.

With respect to FIG. 9, a flow diagram illustrates a method 900 for operating in dual connectivity with LSA, in accordance with various embodiments. The method 900 may be performed by a UE, such as the UE 130 of FIG. 1. While FIG. 9 illustrates a plurality of sequential operations, one of ordinary skill would understand that one or more operations of the method 900 may be transposed and/or performed contemporaneously.

To begin, the method 900 may include operation 905 for operating on a first wireless cell. This first wireless cell may be provided by a first eNB, such as a master eNB. Uplink and/or downlink transmissions in the first wireless cell may occur in a first frequency band f1. This first frequency band f1 may be associated with one or more standards, such as LTE.

The method 900 may further include an operation 910 for operating on a second wireless cell. This second wireless cell may be provided by a second eNB, such as a secondary eNB. The operating on the second wireless cell may simultaneously occur with the operating on the first wireless cell. Therefore, both eNBs may simultaneously provide radio resources. Uplink and/or downlink transmissions in the second wireless cell may occur in a second frequency band f2. This second frequency band f2 may be outside of the f1 band (e.g., f2 may be higher than f1) and may be associated with LSA.

At operation 915, the method 900 may include receiving a notification that is to indicate the second frequency band is unavailable. In various embodiments, this notification may be received from a master eNB. In one embodiment, the notification may be a paging message. The paging message may include a dedicated field for providing a notification that the second frequency band f2 is not available.

In another embodiment, the notification may be a MAC control element. In various embodiments, this may be a MAC control element dedicated to indicating whether an LSA band is or is not available. Such a MAC control element may include a data field that is zero or more bytes. In another embodiment, the notification may be provided through RRC signaling. For example, a master eNB may transmit a dedicated message that may be faster than a broadcast message based on a broadcast message frequency.

The method 900 may include an operation 920 for ceasing communication in the second frequency band f2 based on the notification. In one embodiment, operation 920 may include operations associated with transitioning circuitry for transmission in the f2 band to a low-power state—for example, a radio associated with LSA transmission may be deactivated.

In some embodiments, the operation 920 may include operations associated with ceasing transmission on a bearer—for example, ceasing uplink transmissions using a DRB through a secondary eNB. Transmissions may continue using a bearer associated with the first frequency f1. In some embodiments, operation 920 may include operations associated with controlling at least a part of transmissions to use a new DRB through the first eNB (e.g., master eNB).

In some embodiments, at least one other frequency band f3 associated with LSA may be available. An indication of this other frequency band f3 may be included in the notification that the second frequency band is unavailable. In such embodiments, the method 900 may include an operation 925 for operating, in the dual connectivity mode, on a third wireless cell in a third frequency band. In some embodiments, the third wireless cell may be the same as the second wireless cell provided by the secondary eNB, however transmissions may occur in the third frequency band f3. In some embodiments, operation 925 may include operations associated with controlling at least a part of transmissions to use a new DRB in the third frequency band f3.

Figure 10:
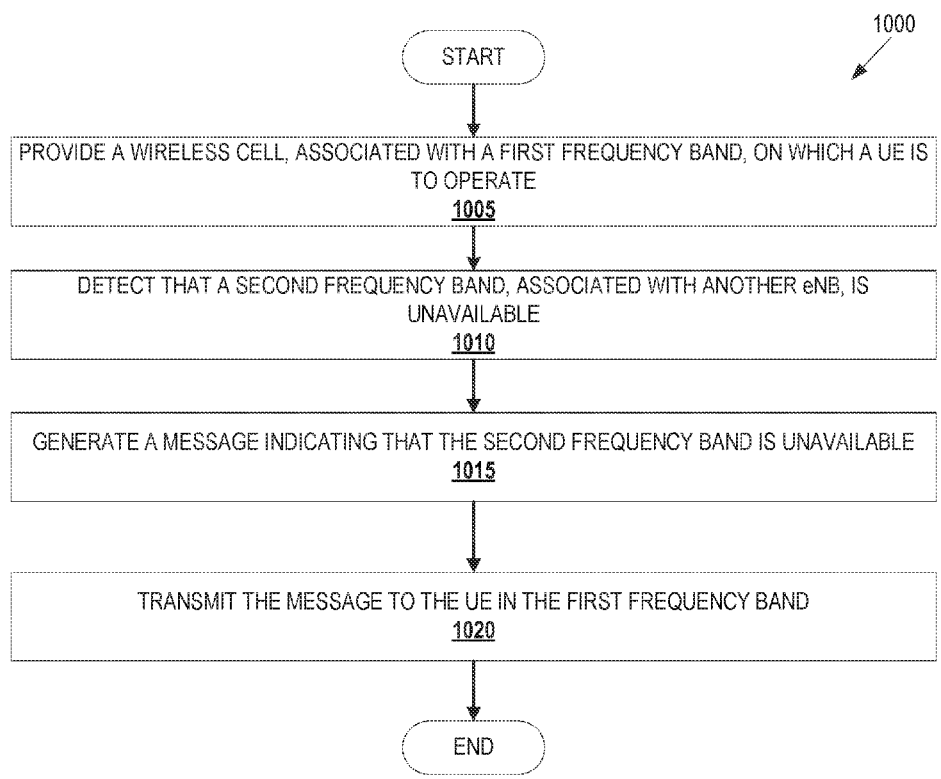
FIG. 10 is a flow diagram illustrating a method for providing a notification that a frequency band associated with Licensed Shared Access is unavailable, in accordance with various embodiments.

With respect to FIG. 10, a flow diagram illustrates a method 1000 for providing a notification that a frequency band associated with LSA is unavailable, in accordance with various embodiments. The method 1000 may be performed by an eNB, such as the eNB 105 of FIG. 1. While FIG. 10 illustrates a plurality of sequential operations, one of ordinary skill would understand that one or more operations of the method 1000 may be transposed and/or performed contemporaneously.

The method 1000 may begin with an operation 1005 for providing a wireless cell on which a UE may operate. In this wireless cell, uplink and/or downlink transmissions may occur in a first frequency band f1. The first frequency band f1 may be associated with a standard, such as LTE or other similar standard.

At an operation 1010, the method 1000 may include detecting that a second frequency band f2, associated with another eNB, is unavailable. In various embodiments, the operation 1010 may include operations associated with receiving a notification from a core network and/or an LSA server that indicates the second frequency band f2 is unavailable.

In various embodiments, the operation 1010 may include operations associated with controlling traffic associated with the UE to cease using a DRB associated with the second frequency band f2. In some embodiments, the operation 1010 may include operations associated with controlling that traffic to use a new DRB associated with the first frequency band and/or controlling that traffic to use a new DRB associated with a third frequency band f3 (if the third frequency band is available).

Subsequently, the method 1000 may include an operation 1015 for generating a message indicating that the second frequency band is unavailable. In one embodiment, the message may be a paging message. The paging message may include a dedicated field for providing a notification that the second frequency band f2 is not available. In another embodiment, the message may be a MAC control element. In various embodiments, this may be a MAC control element dedicated to indicating whether an LSA band is or is not available. Such a MAC control element may include a data field that is zero or more bytes. In another embodiment, the message may be provided through RRC signaling.

In some embodiments, at least one other frequency band f3 associated with LSA may be available. An indication of the at least one other frequency band f3 may be received from a core network and/or an LSA server. An indication of this other frequency band f3 may be included in the message that the second frequency band is unavailable. The method 1000 may include an operation 1020 for transmitting the message to the UE in the first frequency band f1.

Figure 11:
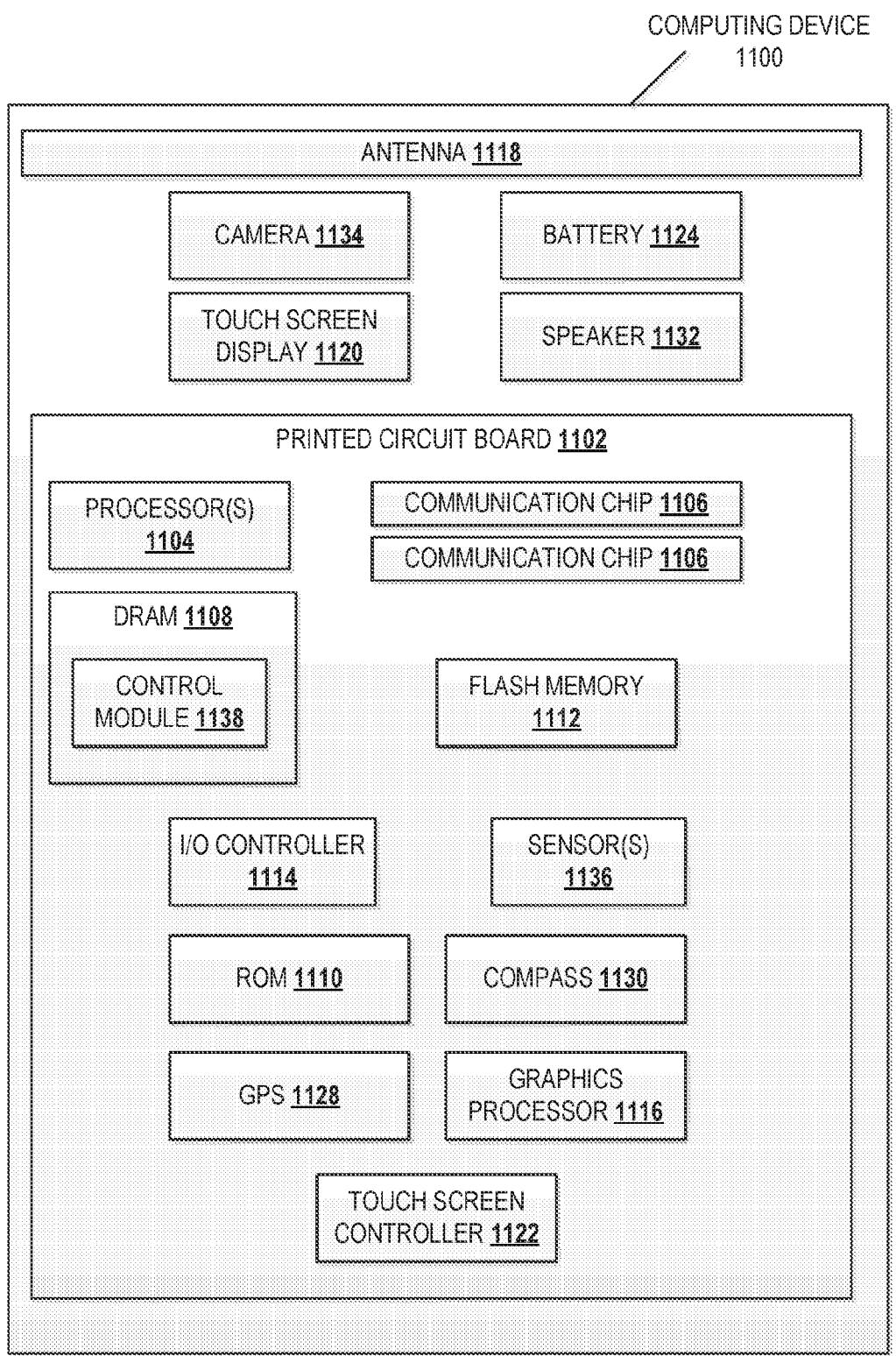
FIG. 11 is a block diagram illustrating a computing device adapted to operate in a wireless communication network, in accordance with various embodiments.

Now with reference to FIG. 11, a block diagram illustrates an example computing device 1100, in accordance with various embodiments. One of the eNBs 105, 130 and/or a UE 130 of FIG. 1 and described herein may be implemented on a computing device such as computing device 1100. Further, the computing device 1100 may be adapted to perform one or more operations of the method 800 described with respect to FIG. 8, the method 900 described with respect to FIG. 9, and/or the method 1000 described with respect to FIG. 10. The computing device 1100 may include a number of components, one or more processors 1104, and one or more communication chips 1106. Depending upon the embodiment, one or more of the enumerated components may comprise "circuitry" of the computing device 1100, such as processing circuitry, communication circuitry, and the like. In various embodiments, the one or more processor(s) 1104 each may be a processor core. In various embodiments, the one or more communication chips 1106 may be physically and electrically coupled with the one or more processor(s) 1104. In further implementations, the communication chips 1106 may be part of the one or more processor(s) 1104. In various embodiments, the computing device 1100 may include a printed circuit board ("PCB") 1102. For these embodiments, the one or more processor(s) 1104 and communication chip 1106 may be disposed thereon. In alternate embodiments, the various components may be coupled without the employment of the PCB 1102.

Depending upon its applications, the computing device 1100 may include other components that may or may not be physically and electrically coupled with the PCB 1102. These other components include, but are not limited to, volatile memory (e.g., dynamic random access memory 1108, also referred to as "DRAM"), non-volatile memory (e.g., read only memory 1110, also referred to as "ROM"), flash memory 1112, an input/output controller 1114, a digital signal processor (not shown), a crypto processor (not shown), a graphics processor 1116, one or more antenna(s) 1118, a display (not shown), a touch screen display 1120, a touch screen controller 1122, a battery 1124, an audio codec (not shown), a video code (not shown), a global navigation satellite system 1128, a compass 1130, an accelerometer (not shown), a gyroscope (not shown), a speaker 1132, a camera 1134, one or more sensors 1136 (e.g., a barometer, Geiger counter, thermometer, viscometer, rheometer, altimeter, or other sensor that may be found in various manufacturing environments or used in other applications), a mass storage device (e.g., a hard disk drive, a solid state drive, compact disk and drive, digital versatile disk and drive, etc.) (not shown), and the like. In various embodiments, the one or more processor(s) 1104 may be integrated on the same die with other components to form a system on a chip ("SOC").

In various embodiments, volatile memory (e.g., DRAM 1108), non-volatile memory (e.g., ROM 1110), flash memory 1112, and the mass storage device (not shown) may include programming instructions configured to enable the computing device 1100, in response to the execution by one or more processor(s) 1104, to practice all or selected aspects of the data exchanges and methods described herein, depending on the embodiment of the computing device 1100 used to implement such data exchanges and methods. More specifically, one or more of the memory components (e.g., DRAM 1108, ROM 1110, flash memory 1112, and the mass storage device) may include temporal and/or persistent copies of instructions that, when executed by one or more processor(s) 1104, enable the computing device 1100 to operate one or more modules 1138 configured to practice all or selected aspects of the data exchanges and method described herein, depending on the embodiment of the computing device 1100 used to implement such data exchanges and methods.

The communication chips 1106 may enable wired and/or wireless communication for the transfer of data to and from the computing device 1100. The term "wireless" and its derivatives may be used to describe circuits, devices, systems, methods, techniques, communication channels, etc., that may communicate data through the use of modulated electromagnetic radiation through a non-solid medium. The term does not imply that the associated devices do not contain any wires, although in some embodiments they might not. The communication chips 1106 may implement any of a number of wireless standards or protocols, including but not limited to LTE, LTE-A, Institute of Electrical and Electronics Engineers ("IEEE") 702.20, General Packet Radio Service ("GPRS"), Evolution Data Optimized ("Ev-DO"), Evolved High Speed Packet Access ("HSPA+"), Evolved High Speed Downlink Packet Access ("HSDPA+"), Evolved High Speed Uplink Packet Access ("HSUPA+"), Global System for Mobile Communications ("GSM"), Enhanced Data Rates for GSM Evolution ("EDGE"), Code Division Multiple Access ("CDMA"), Time Division Multiple Access ("TDMA"), Digital Enhanced Cordless Telecommunications ("DECT"), Bluetooth, derivatives thereof, as well as other wireless protocols that are designated as 3G, 4G, 5G, and beyond. The computing device 1100 may include a plurality of communication chips 1106 adapted to perform different communication functions. For example, a first communication chip 1106 may be dedicated to shorter range wireless communications, such as Wi-Fi and Bluetooth, whereas a second communication chip 1106 may be dedicated to longer range wireless communications, such as GPS, EDGE, GPRS, CDMA, WiMAX, LTE, LTE-A, Ev-DO, and the like.

FIG. 12 illustrates a device 1200 in accordance with some embodiments. The device 1200 may be similar to and/or included in one of the eNBs 105, 130 and/or the UE 130 of FIG. 1. The device 1200 may include processing circuitry 1202, transmitter circuitry 1205, receiver circuitry 1210, communications circuitry 1215, and one or more antennas 1220 coupled with each other at least as shown.

Briefly, the communications circuitry 1215 may be coupled with the antennas 1220 to facilitate over-the-air communication of signals to/from the device 1200. Operations of the communications circuitry 1215 may include, but are not limited to, filtering, amplifying, storing, modulating, demodulating, transforming, etc. In various embodiments, the communications circuitry 1215 may comprise a plurality of different circuitries (e.g., radios). A first one of these communications circuitries may be adapted for communication in a first frequency band f1 (e.g., an LTE-compatible frequency band). Another one of these communications circuitries may be adapted for communication in another frequency band f2 (e.g., an LSA-associated frequency band). In some embodiments, the processing circuitry 1202 may independently power these circuitries so that one circuitry may be transitioned to a low-power state (e.g., switched off) while the other circuitry remains powered.

The transmitter circuitry 1205 may be coupled with the communications circuitry 1215 and may be configured to provide signals to the communications circuitry 1215 for transmission by the antennas 1220. In various embodiments, the transmitter circuitry 1205 may be configured to provide various signal processing operations on the signal to provide the signal to the communications circuitry 1215 with appropriate characteristics. In some embodiments, the transmitter circuitry 1205 may be adapted to generate signals. Further, the transmitter circuitry 1205 may be adapted to scramble, multiplex, and/or modulate various signals prior to transmission by the communications circuitry 1215.

The receiver circuitry 1210 may be coupled with the communications circuitry 1215 and may be configured to receive signals from the communications circuitry 1215. In some embodiments, the receiver circuitry 1210 may be adapted to generate signals. Further, the receiver circuitry 1210 may be adapted to descramble, de-multiplex, and/or demodulate various signals following reception by the communications circuitry 1215.

The processing circuitry 1202 may be coupled with the transmitter circuitry 1205, the receiver circuitry 1210, and/or the communications circuitry 1215. The processing circuitry may be adapted to perform operations described herein with respect to an eNB and/or a UE. In some embodiments, the processing circuitry 1202 may be adapted to generate, process, and/or manipulate data that is to be transmitted over the air, e.g., to and/or from an eNB and/or a UE.

Some or all of the communications circuitry 1215, transmitter circuitry 1205, and/or receiver circuitry 1210 may be included in, for example, a communication chip and/or communicatively coupled with a printed circuit board as described with respect to FIG. 11.

In various embodiments, example 1 user equipment ("UE") circuitry comprising: first communications circuitry to operate on a first wireless cell, associated with a first frequency band, provided by a master evolved Node B ("eNB"); second communications circuitry to operate on a second wireless cell, associated with a second frequency band, provided by a secondary eNB; and processing circuitry, coupled with the first communications circuitry and the second communications circuitry, to control the second communications circuitry to operate on the second wireless cell simultaneous with the operation of the first communications circuitry on the first wireless cell, to detect availability of the second frequency band based on communication with the master eNB, and to cause the second communications circuitry to transition to a low-power state based on a detection that the second frequency band is unavailable. Example 2 may include the UE circuitry of example 1, wherein the processing circuitry is to cause the second communications circuitry to transition to the low-power state by turning off the second communications circuitry. Example 3 may include the UE circuitry of example 1, wherein operation on the first wireless cell includes first traffic that is to use a first data radio bearer ("DRB") and operation on the second wireless cell includes second traffic that is to use a second DRB, and the processing circuitry is to control the second traffic to use first DRB and not the second DRB based on the detection of the availability of the second frequency band. Example 4 may include the UE circuitry of example 1, wherein the operation on the first wireless cell includes first traffic that is to use a first data radio bearer ("DRB") and operation on the second wireless cell includes second traffic that is to use a second DRB, and the processing circuitry is to control the second traffic to use a new DRB through the master eNB and not the second DRB based on the detection of the availability of the second frequency band. Example 5 may include the UE circuitry of any of examples 1-4, wherein the first communications circuitry comprises: receiver circuitry, coupled with the processing circuitry, to receive a notification from the master eNB for the detection of the availability of the second frequency band. Example 6 may include the UE circuitry of example 5, wherein the notification comprises a Media Access Control ("MAC") control element. Example 7 may include the UE circuitry of example 5, wherein the notification comprises a paging message or a radio resource control ("RRC") message. Example 8 may include the UE circuitry of any of examples 1-4, wherein the first frequency band is associated with Long Term Evolution ("LTE") and the second frequency band is associated with Licensed Shared Access ("LSA").

In various embodiments, example 9 may include user equipment ("UE") circuitry comprising: communications circuitry to operate in dual connectivity on a first wireless cell associated with a first frequency band and on a second wireless cell associated with a second frequency band; processing circuitry, coupled with the first communications circuitry and the second communications circuitry, to: determine that the second frequency band is no longer accessible; determine that a third frequency band is accessible; and control the second communications circuitry to operate on a third wireless cell associated with the third frequency band. Example 10 may include the UE circuitry of example 9, wherein a secondary evolved Node B ("eNB") provides both the second wireless cell associated with the second frequency band and the third wireless cell associated with the third frequency band. Example 11 may include the UE circuitry of example 9, wherein the processing circuitry is to determine that the second frequency band is no longer accessible based on a notification, and further wherein the communications circuitry comprises: receiver circuitry, coupled with the processing circuitry, to receive the notification from a master evolved Node B ("eNB") that is to provide the first wireless cell. Example 12 may include the UE circuitry of example 11, wherein the notification comprises a Media Access Control ("MAC") control element, a paging message, or a radio resource control ("RRC") message. Example 13 may include the UE circuitry of example 11, wherein the receiver circuitry is further to receive a Media Access Control ("MAC") control element that includes an indication of the third frequency band from the master eNB. Example 14 may include the UE circuitry of any of examples 9-13, wherein the operation on the first wireless cell includes first traffic that is to use a first data radio bearer ("DRB") and operation on the second wireless cell includes second traffic that is to use a second DRB, and the processing circuitry is to control the second traffic to use a new DRB through the third wireless cell and not the second DRB based on the determination that the second frequency band is no longer accessible. Example 15 may include the UE circuitry of any of examples 9-13, wherein the first frequency band is associated with Long Term Evolution ("LTE") and the second and third frequency bands are associated with Licensed Shared Access ("LSA"). Example 16 may include the evolved Node B ("eNB") circuitry comprising: processing circuitry to: provide a wireless cell, associated with a first frequency band, on which a user equipment ("UE") is to operate; detect that a second frequency band, associated with another eNB, is unavailable; and generate a message indicating that the second frequency band is unavailable based on the detection; and transmitter circuitry, coupled with the processing circuitry, to transmit the generated message to the UE in the first frequency band. Example 17 may include the eNB circuitry of example 16, wherein the generated message is transmitted to the UE as a broadcast paging message or through radio resource control ("RRC") signaling. Example 18 may include the eNB circuitry of example 16, wherein the generated message is transmitted to the UE as a Media Access Control ("MAC") control element. Example 19 may include the eNB circuitry of example 18, wherein the MAC control element includes an indication of a third frequency band to be used by the UE. Example 20 may include the eNB circuitry of any of examples 16-19, wherein the processing circuitry is control traffic associated with the UE to use a first data radio bearer ("DRB") through the eNB and not use a second DRB that is split through another eNB. Example 21 may include the eNB circuitry of example 20, wherein the processing circuitry is control at least a part of traffic associated with the UE to use a new data radio bearer ("DRB") through another wireless cell associated with a third frequency band. Example 22 may include the eNB circuitry of any of examples 16-19, further comprising: receive circuitry, coupled with the processing circuitry, to receive a notification associated with the second frequency band from a core network, wherein the processing circuitry is to detect that the second frequency band is unavailable based on the notification.

In various embodiments, example 23 may include one or more non-transitory computer-readable media comprising computing device-executable instructions, wherein the instructions, in response to execution by a user equipment ("UE"), cause the UE to: operate in a dual connectivity mode on a first wireless cell in a first frequency band, provided by a first evolved Node B ("eNB"), and on a second wireless cell in a second frequency band, provided by a second eNB; process a notification that is to indicate the second frequency band is unavailable; control a radio to cease communication in the second frequency band based on the notification. Example 24 may include the one or more non-transitory computer-readable media of example 23, wherein the instructions further cause the UE to: operate, in the dual connectivity mode, on a third wireless cell associated in a third frequency band based on an indication that the third frequency band is available. Example 25 may include the one or more non-transitory computer-readable media of example 24, wherein the notification is included in a Media Access Control ("MAC") control element, and further wherein the MAC control element includes the indication that the third frequency band is available.

In various embodiments, example 26 may include one or more non-transitory computer-readable media comprising computing device-executable instructions, wherein the instructions, in response to execution by a user equipment ("UE"), cause the UE to: operate on a first wireless cell, associated with a first frequency band, provided by a master evolved Node B ("eNB"); operate, simultaneously with the operation on the first wireless cell, on a second wireless cell, associated with a second frequency band, provided by a secondary eNB; detect availability of the second frequency band based on communication with the master eNB; and cause a radio of the UE associated with the operation on the second wireless cell to transition to a low-power state based on a detection that the second frequency band is unavailable. Example 27 may include the one or more non-transitory computer-readable media of example 26, wherein to cause the radio to transition to the low-power state comprises to turn off the radio. Example 28 may include the one or more non-transitory computer-readable media of example 26, wherein the operation on the first wireless cell includes first traffic that is to use a first data radio bearer ("DRB") and the operation on the second wireless cell includes second traffic that is to use a second DRB, and further wherein the instructions are to cause the UE to control the second traffic to use first DRB and not the second DRB based on the detection of the availability of the second frequency band. Example 29 may include the one or more non-transitory computer-readable media of example 26, wherein the instructions further cause the UE to: receive a notification from the master eNB for the detection of the availability of the second frequency band.

In various embodiments, example 30 may include one or more non-transitory computer-readable media comprising computing device-executable instructions, wherein the instructions, in response to execution by an evolved Node B ("eNB"), cause the eNB to: provide a wireless cell, associated with a first frequency band, on which a user equipment ("UE") is to operate; detect that a second frequency band, associated with another eNB, is unavailable; generate a message indicating that the second frequency band is unavailable based on the detection; and transmit the generated message to the UE in the first frequency band. Example 31 may include the one or more non-transitory computer-readable media of example 30, wherein the instructions are to cause eNB to transmit the generated to message the UE as a broadcast paging message or through radio resource control ("RRC") signaling. Example 32 may include the one or more non-transitory computer-readable media of example 30, wherein the instructions are to cause eNB to transmit the generated message is transmitted to the UE as a Media Access Control ("MAC") control element. Example 33 may include the one or more non-transitory computer-readable media of example 32, wherein the MAC control element includes an indication of a third frequency band to be used by the UE. Example 34 may include the one or more non-transitory computer-readable media of any of examples 30-33, wherein the instructions are further to cause the eNB to: receive a notification associated with the second frequency band from a core network, wherein the detection that the second frequency band is unavailable based on the notification.

In various embodiments, example 35 may include a method to be performed by an evolved Node B ("eNB"), the method comprising: providing a wireless cell, associated with a first frequency band, on which a user equipment ("UE") is to operate; detecting that a second frequency band, associated with another eNB, is unavailable; generating a message indicating that the second frequency band is unavailable based on the detection; and transmitting the generated message to the UE in the first frequency band. Example 36 may include the method of example 35, wherein the transmitting the generated message to the UE as a broadcast paging message, through radio resource control ("RRC") signaling, or as a Media Access Control ("MAC") control element. Example 37 may include the method of any of examples 35-36, further comprising: receiving a notification associated with the second frequency band from a core network, wherein the detecting that the second frequency band is unavailable based on the notification.

In various embodiments, example 38 may include a method to be performed by a user equipment ("UE"), the method comprising: operating in a dual connectivity mode on a first wireless cell in a first frequency band, provided by a first evolved Node B ("eNB"), and on a second wireless cell in a second frequency band, provided by a second eNB; processing a notification that is to indicate the second frequency band is unavailable; controlling a radio to cease communication in the second frequency band based on the notification. Example 39 may include the method of example 38, further comprising: operating, in the dual connectivity mode, on a third wireless cell associated in a third frequency band based on an indication that the third frequency band is available. Example 40 may include the method of example 39, wherein the notification is included in a Media Access Control ("MAC") control element, and further wherein the MAC control element includes the indication that the third frequency band is available.

Some portions of the preceding detailed description have been presented in terms of algorithms and symbolic representations of operations on data bits within a computer memory. These algorithmic descriptions and representations are the ways used by those skilled in the data processing arts to most effectively convey the substance of their work to others skilled in the arts. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

Embodiments of the invention also relate to an apparatus for performing the operations herein. Such a computer program is stored in a non-transitory computer-readable medium. A machine-readable medium includes any mechanism for storing information in a form readable by a machine (e.g., a computer). For example, a machine-readable (e.g., computer-readable) medium includes a machine- (e.g., a computer-) readable storage medium (e.g., read only memory ("ROM"), random access memory ("RAM"), magnetic disk storage media, optical storage media, flash memory devices).

The processes or methods depicted in the preceding figures can be performed by processing logic that comprises hardware (e.g., circuitry, dedicated logic, etc.), software (e.g., embodied on a non-transitory computer-readable medium), or a combination of both. Although the processes or methods are described above in terms of some sequential operations, it should be appreciated that some of the operations described can be performed in a different order. Moreover, some operations can be performed in parallel rather than sequentially.

Embodiments of the present invention are not described with reference to any particular programming language. It will be appreciated that a variety of programming languages can be used to implement the teachings of embodiments of the invention as described herein. In the foregoing Specification, embodiments of the invention have been described with reference to specific exemplary embodiments thereof. It will be evident that various modifications can be made thereto without departing from the broader spirit and scope of the invention as set forth in the following claims. The Specification and drawings are, accordingly, to be regarded in an illustrative sense rather than a restrictive sense.

What is claimed is:

1. Evolved Node B ("eNB") circuitry comprising:
   processor circuitry to:
   provide a first wireless cell, associated with a first frequency band, on which a user equipment ("UE") is to operate;
   detect that a second frequency band, associated with a second different wireless cell, which is provided by a remote eNB, is unavailable, wherein the second frequency band associated with the second wireless cell does not overlap with the first frequency band associated with the first wireless cell, and wherein the second frequency band includes frequencies 2300 Mhz or greater and the first frequency band includes frequencies of less than 2300 Mhz; and
   generate a message to indicate that the second frequency band is unavailable based on the detection; and
   transmitter circuitry, coupled with the processor circuitry, to transmit the message to the UE in the first frequency band.

2. The eNB circuitry of claim 1, wherein the message is transmitted to the UE as a broadcast paging message.

3. The eNB circuitry of claim 1, wherein the message is transmitted to the UE through radio resource control ("RRC") signaling.

4. The eNB circuitry of claim 1, wherein the message is a first message and:
   the processor circuitry is to generate a second message to indicate a third frequency band to be used to communicate responsive to the unavailability of the second frequency band; and
   the transmitter circuitry is to transmit the second message to indicate the third frequency band to the remote eNB.

5. The eNB circuitry of claim 1, wherein the message comprises a Media Access Control ("MAC") control element.

6. The eNB circuitry of claim 1, wherein the message comprises a message deliverable when the UE is in an RRC idle state.

7. The eNB circuitry of claim 6, wherein the transmitter circuitry is to transmit the message on a broadcast message frequency.

8. The eNB circuitry of claim 1, wherein the message includes a dedicated field to notify the UE that the second frequency band is unavailable.

9. The eNB circuitry of claim 8, wherein the dedicated field comprises a MAC control element.

10. The eNB circuitry of claim 9, wherein the MAC control element comprises a link control identifier ("LCD") that includes a first value to delineate the second frequency band and a second value to indicate whether or not the second frequency band is available.

11. User equipment ("UE") circuitry comprising:
    first communications circuitry to operate on a first wireless cell, associated with a first frequency band, provided by a first evolved Node B ("eNB");
    second communications circuitry to operate on a second different wireless cell, associated with a second frequency band, provided by a second eNB, wherein the second frequency band associated with the second wireless cell does not overlap with the first frequency band associated with the first wireless cell, and wherein the second frequency band includes frequencies 2300 Mhz or greater and the first frequency band includes frequencies of less than 2300 Mhz; and
    processor circuitry, coupled with the first communications circuitry and the second communications circuitry, to control the second communications circuitry to operate on the second wireless cell simultaneous with the operation of the first communications circuitry on the first wireless cell, to detect availability of the second frequency band based on communication with the first eNB, and to cause the second communications circuitry to transition to a low-power state based on a detection that the second frequency band is unavailable;
    wherein the first communications circuitry comprises:
    receiver circuitry, coupled with the processor circuitry, to receive a notification originating from the first eNB for the detection of the availability of the second frequency band.

12. The UE circuitry of claim 11, wherein the notification comprises a broadcast paging message.

13. The UE circuitry of claim 11, wherein the notification comprises radio resource control ("RRC") signaling.

14. The UE circuitry of claim 11, wherein the notification comprises a Media Access Control ("MAC") control element.

15. The UE circuitry of claim 11, wherein the processor circuitry is to identify the notification at a time that the UE is in an RRC idle state.

16. The UE circuitry of claim 11, wherein the notification is associated with a broadcast message frequency.

17. The UE circuitry of claim 11, wherein the notification comprises a dedicated field to notify the UE that the second frequency band is unavailable.

18. The UE circuitry of claim 17, wherein the dedicated field comprises a MAC control element that includes a link control identifier ("LCID"), wherein the LCID includes a first value to delineate the second frequency band and a second value to indicate whether or not the second frequency band is available.

19. One or more non-transitory computer-readable media comprising compute device-executable instructions, wherein the instructions, in response to execution by a user equipment ("UE"), cause the UE to:
operate in a dual connectivity mode on a first wireless cell in a first frequency band, provided by a first evolved Node B ("eNB") of a group of eNBs, and on a second different wireless cell in a second frequency band, provided by a second different eNB of the group of eNBs, wherein the second frequency band associated with the second wireless cell does not overlap with the first frequency band associated with the first wireless cell, and wherein the second frequency band includes frequencies 2300 Mhz or greater and the first frequency band includes frequencies of less than 2300 Mhz;
process a notification that is to indicate the second frequency band is unavailable; and
control a radio to cease communication in the second frequency band based on the notification.

20. The one or more non-transitory computer-readable media of claim 19, wherein the notification comprises at least one of a Media Access Control ("MAC") control element or a paging message received on a broadcast message frequency.

* * * * *